United States Patent [19]

Oger

[11] 4,363,939
[45] Dec. 14, 1982

[54] ELECTRICAL SUPPLY LINE FOR THE SUPPLY OR CURRENT TO RAILWAY VEHICLES

[75] Inventor: René Oger, Ville d'Avray, France

[73] Assignee: C. Delachaux, Gennevilliers, France

[21] Appl. No.: 205,662

[22] Filed: Nov. 10, 1980

[30] Foreign Application Priority Data

Nov. 23, 1979 [FR] France .............................. 79 28957

[51] Int. Cl.³ .............................................. B60M 1/24
[52] U.S. Cl. ..................................................... 191/43
[58] Field of Search ................................... 191/40–44

[56] References Cited

U.S. PATENT DOCUMENTS 2,404,088  7/1946  Pinkerton ........................ 191/40 X
3,985,211  10/1976  Bommart .......................... 191/40 X
4,230,209  10/1980  Ohura ................................. 191/40

Primary Examiner—Richard A. Schacher
Attorney, Agent, or Firm—Parmelee, Miller, Welsh & Kratz

[57] ABSTRACT

An electrical supply line for the supply of current to railway vehicles comprises at least one wire conductor forming a current supply line for a current pick-up device. A rigid body, which may be electrically conducting or otherwise and which is covered with an insulating covering, is constituted by rails and supports the wire conductor. The rails are located in an end-to-end relationship support the wire conductor at spaced intervals by means of attachment members.

3 Claims, 17 Drawing Figures

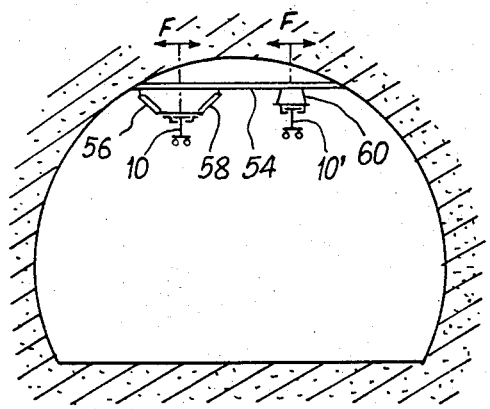
Fig:5
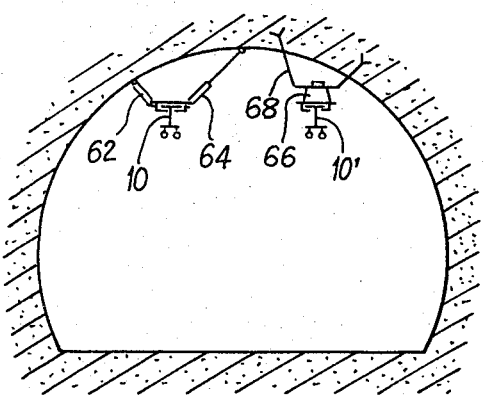
Fig:6
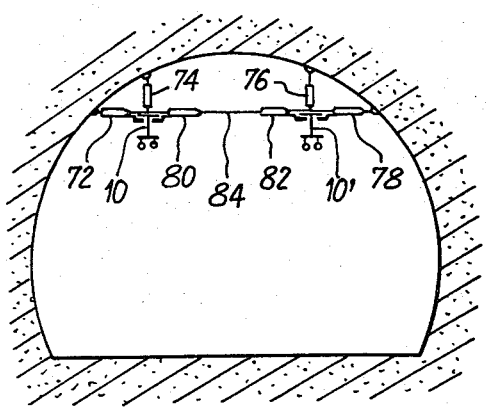
Fig:7
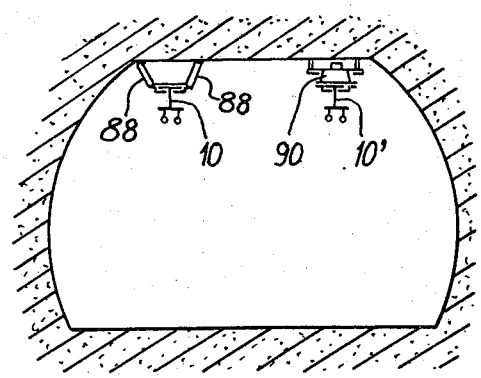
Fig:8

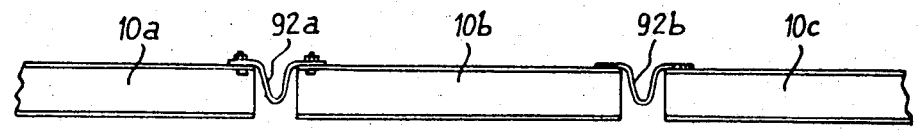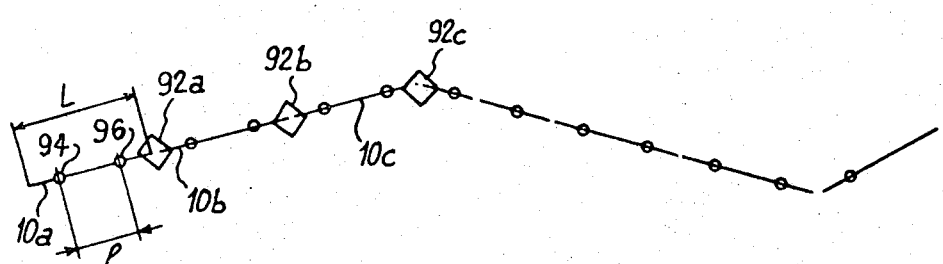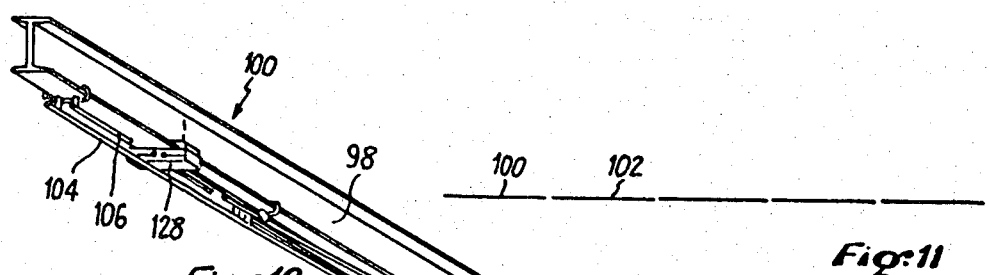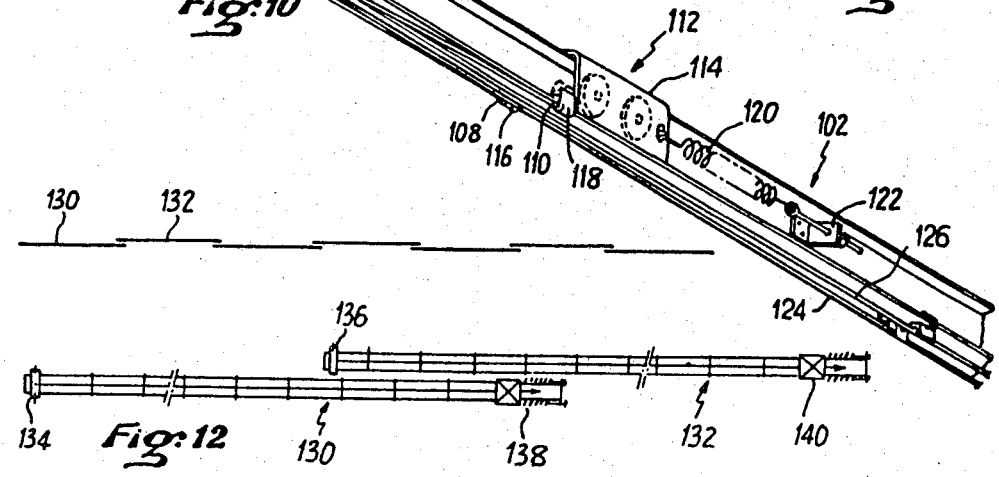

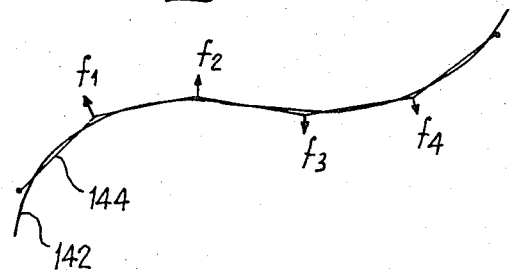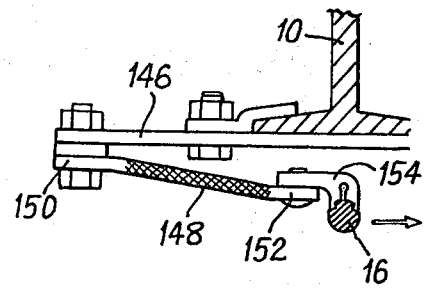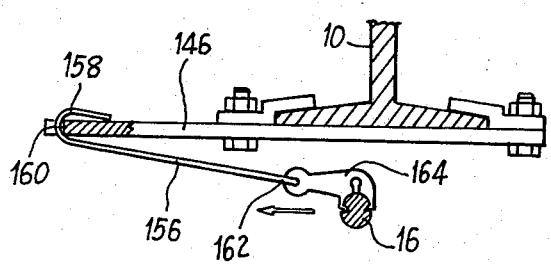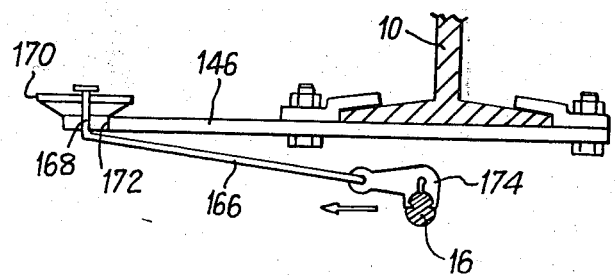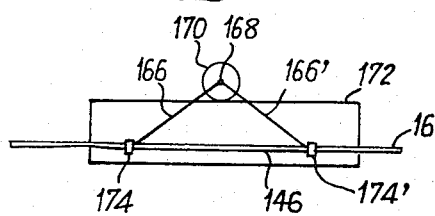

ELECTRICAL SUPPLY LINE FOR THE SUPPLY OR CURRENT TO RAILWAY VEHICLES

The present invention is concerned with an electricity supply line particularly for the supply of current to vehicles on rails such as high or low speed underground transport systems.

It is already known to have electricity supply lines comprising a conducting wire or several supported parallel conducting wires between locations which constitute a current supply line for a mobile current pick-up device such as the bow of a pantograph of an electric motor.

Also known are flexible supply lines in which the conducting wire or wires are suspended from a known structure called a catenary. Such supply lines have as their principal advantage their flexibility and consequently permit the supply of electricity to transport carriages circulating at high speed. They are however inconvenient in presenting an important disadvantage by the height that they must occupy which is relevant when they have to be installed under arches or in the position that would be occupied by a third rail.

Also known are rigid supply lines in which the conducting wire or wires are housed in a rigid hollow conductor body constituted by a series of rails placed end-to-end. Such supply lines have as their principal advantage that they take up little space and are especially convenient for use under arches. Their principal disadvantage is their rigidity which imposes on the movable device for picking up current the absorption of all deformations and thus necessitates the use of a current pick-up device having an elevated natural frequency in the case where the circulating carriages circulate at high speed.

The present invention concerns an electricity supply line which remedies the aforesaid inconveniences and which offers at the same time the advantage that little space is taken up and of high flexibility to permit its use under arches and/or for high speed railway systems.

The electricity supply line of the invention is useful particularly for the supply of current to vehicles on rails and is of the type comprising one or more parallel conductor wires supported from location to location and which constitute a current supply line for a movable mobile current pick-up device.

According to the essential feature of the invention this line comprises a rigid body, conductive or not, provided with an insulating covering and constituted by rails disposed end-to-end and the conductor wire or wires are supported between locations by the profiled elements by attachment members.

According to another aspect of the invention the electric supply line comprises two conductor wires which are supported alternately by attachment members such that one fixing member supports only one wire conductor. These attachment members are advantageously freely mounted on the rails with the possibility of vertical clearance and longitudinal sliding relative to the rails.

In a modification, it can support several conductor wires, for example from one to five conductor wires on a single attachment member or even on a plurality of attachment members.

In a preferred embodiment, each attachment member comprises a hanger freely mounted on the rail and a clip for the conductor wire supported by the hanger.

The rails are advantageously of I-shaped profile and the attachment members each advantageously have two curved portions adapted to cooperate with the foot of the I-profile of the rail.

The rails are preferably conductors connected by flexible electrical connections playing at the same time the role of expansion and curved joints, the wire conductor or conductors being electrically coupled to to rails. The rails are grouped in lengths each comprising a certain number of rails and a single continuous length of each wire conductor whereof a first end is fixed to a first end of the length of rails and whereof the second end of the wire conductor is attached to the other end of the length by a hanger.

The rails are the equivalent to a simple electricity supply line for heavy current (1000, 2000 or 3000 amperes) without feeder and cabling, presenting increased reliability.

The rails can be conductors, or not, and in the case where there are conductors, provided with an insulating covering, for example by cabling, covering, etc., in order to be able to approach the arches as near as possible and to limit the surfaces under electric voltage. In the case where they are not conductors they can be formed of a synthetic material, for example a plastics material, having the required resistance.

The present invention also envisages that the line comprises members adapted to centre the wire conductors in the hollow bodies of the supply line. These centering members preferably each comprise at least one connecting element whereof one end is connected to the edge of a plate fixed under a profiled element and whereof the other end is fastened to a conductor wire through the intermediary of a clamp.

Embodiments of the present invention will now be described, by way of example, with reference to the accompanying drawings, in which:

FIGS. 5 to 8 show different embodiments of a supply line according to the invention under an arch.

FIG. 9 shows the electric connection between rails.

FIGS. 10 shows an electricity supply line according to the invention provided with an anchoring member for the wire conductors.

FIG. 11 illustrates the joining end-to-end of the sections of the electricity supply line according to the invention.

FIG. 12 illustrates the joining with lapping of the sections of the electricity supply line according to the invention.

FIG. 13 shows the position of the centering members in a curve.

FIGS. 14 to 16 illustrate different embodiments of centering members according to the invention.

FIG. 17 is a view from below of the centering member of FIG. 16.

Figure 1:
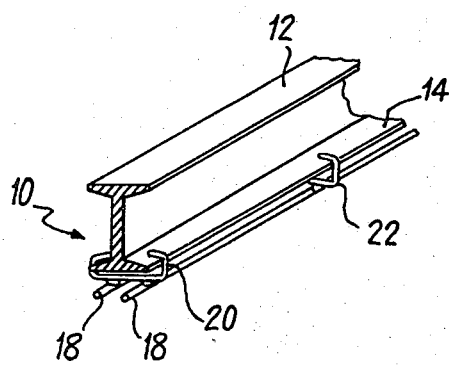
FIG. 1 is a perspective view of a portion of an electricity supply line with two conductor wires according to the invention.

There is shown in FIG. 1 a portion of an electricity supply line according to the invention comprising a rigid conductor body constituted by rails 10 disposed end-to-end and connected electrically. Each rail 10 is formed of an electrically conductive material, preferably aluminium alloy, having the required qualities of lightness in weight and good conductivity of electricity, and having an I-shaped profile with a head 12 and a foot 14. The head 12 is adapted to be fixed for example under an arch through the intermediary of insulators or insulating fasteners as will be described later. The foot 14 serves to support two upper wire conductors 16 and 18 through attachment members such as 20 and 22 disposed at locations under the rail 10.

The rails 10 are subject to electric voltage and the wire conductors 16 and 18 are supplied with current by flexible electric connections (not shown).

The two wire conductors 16 and 18 are supported alternatively by the attachment members, such as 20 and 22, in such a way that one attachment member only supports a single wire conductor. Thus, the attachment member 20 only supports the wire conductor 18 and the attachment member 22 only supports the wire conductor 16. The wire conductors 16 and 18 are mounted parallel and form a current supply line for a mobile current pick-up device (not shown) such as for example the bow of a pantograph of an electrically driven vehicle. The two wire conductors 16 and 18 do not form two independent current supply lines but a single current supply line and they can, without difficulty, come into contact with each other.

The attachment members are mounted freely on the rails with the possibility of vertical wheel clearance and longitudinal sliding in order to confer the greatest flexibility to the electric supply line and also permit the free play of the attachment members on the rails during the application of the forces which are produced on the electric supply line, notably during the passage of a mobile current pick-up device travelling at great speed or during the constraint of expansion. Thus a floating mounting of the attachment members on the rails is formed.

The different ways of forming the attachment members will now be described with reference to FIGS. 2 to 4.

Figure 2:
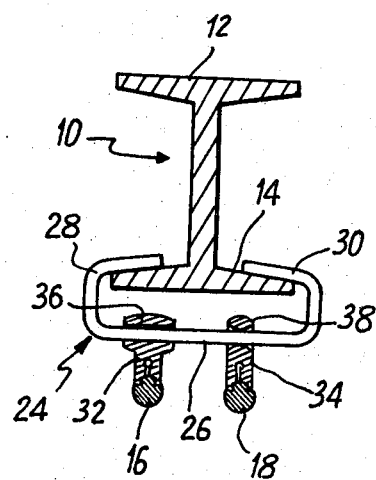
FIGS. 2 to 4 show different embodiments of fixing members for the conductor wires of the supply line of FIG. 1.

Shown in FIG. 2 is an attachment member 24 comprising a hanger formed by a rod of circular section made, for example of metal, which may or may not be insulated, and including a straight portion 26 located transversely and below the rail 10, and two curved portions 28 and 30 adapted to cooperate with the foot 14 of the I cross-section 10. The attachment member 24 is freely mounted on the rail 10 as previously indicated. The portion 26 of the attachment member 24 serves to support a fixing clip 32 or 34 adapted to grip, in a clipping manner, a conductor wire 16 or 18 grooved on their side. In the example of FIG. 2 the member 24 supports two conductor wires but may support only one conductor wire as shown in FIG. 1.

The clip 32 comprises a sleeve 36 ensuring that it can freely slide on portion 26 and ensuring at the same time that this portion 26 remains perpendicular to the longitudinal axis of the rail 10. The clip 34 does not have a sleeve but an orifice 38 permitting its free sliding on the portion 26.

Figure 3:
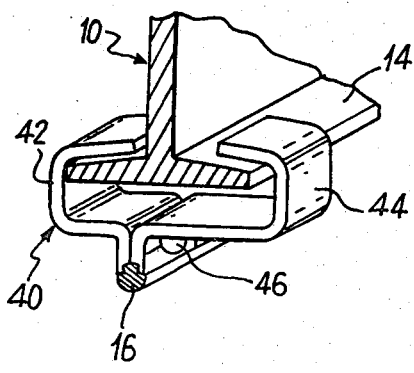

FIG. 3 shows an attachment member 40 in the form of a hanger constituted by two curved straps 42 and 44 connected by a bolt 46 and holding between them in a clip-like manner a conductor wire 16 grooved on its two faces. The attachment member 40 is freely mounted on the rail 10 but it does not permit lateral movement of the conductor wire 16 as in the case of the FIG. 2 embodiment.

Figure 4:
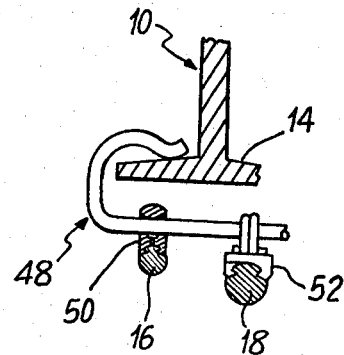

FIG. 4 shows an attachment member 48 in the form of a hanger supporting a clip 50 or 52 carrying, in clip-like manner, a conductor wire 16 or 18 respectively. The clip 50 is unitary in construction, like clips 32 and 34 of FIG. 2, while the clip 52 is, in known manner, of multi-part construction. Clips 50 and 52 permit the lateral adjustment of conductor wires 16 and 18. However, as in the case of FIG. 2, the attachment member 48 serves to mount only a single conductor wire and thus only mounts a single clip 50 or 52.

As previously indicated, the rails 10 are especially convenient for use in arches.

There is shown in FIG. 5 the securement of two rails 10 and 10' under an arch through the intermediary of a transverse support 54 anchored at its two ends to the arch wall. The rail 10 is secured on the transverse support 54 by two insulating rings 56 and 58, known per se, and the rail 10' is secured on the transverse support 54 by isolator 60, also known per se. Such an arrangement has the advantage of permitting easy lateral adjustment of the rails relative to the transverse support 54 as indicated by arrows F.

FIG. 6 shows another way of securement in which the rails 10 and 10' are directly suspended from the arch roof through the intermediary of insulating rings 62 and 64 in the case of rail 10 and through the intermediary of an insulator 66 and a support 68 in the case of the rail 10'.

FIG. 7 shows yet another method of securement under an arch in which the rail 10 is fixed under the arch by insulating rings 72 and 74 and the rail 10' by insulating rings 76 and 78, the two rails 10 and 10' being also connected together through the intermediary of two insulating rings 80 and 82 and a horizontal tie bar 84.

FIG. 8 shows the fixing under the flattened arch of a rail 10 by means of two insulated rings 86 and 88 and of a rail 10' by means of an insulator 90 fixed under the roof of the arch.

As shown in FIG. 9, the rails such as 10A, 10B, and 10C are connected together by flexible electrical connections, such as 92A, 92B etc., adopting at one and the same time the role of expansion and curvable joints connecting the different rails together. These electrical connections are preferably formed by metallic braided cable or sheets which are capable of being attached to the rails by being soldered by a bimetallic solder (connection 92B) to a bolted down plate located around the rail (connection 92A).

As shown in the lower part of FIG. 9, the rails 10A, 10B, 10C etc., are connected end-to-end by electrical connections such as 92A, 92B, 92C etc., each rail having a length L, for example, of ten meters, and being supported by two insulators, such as 94 and 96 spaced by a length L, for example of five meters. The rails are dispersed in a zig-zag fashion in order to ensure, in known manner, even wear of the current pick-up device, for example the bow of a pantograph of an electric vehicle. The lateral amplitude of the zig-zag is exaggerated in FIG. 9 for clarity.

The rails are grouped in lengths each comprising a certain number of rails (for example a length of 300 meters comprising 30 rails spaced 10 meters apart) and a single continuous length of each wire conductor. These lengths are electrically connected together. It is also necessary to ensure that each length can carry, independently from the other length, the mechanical tension of the continuous length of the two wire conductors which they support.

FIG. 10 shows a rail 98 comprising the joint between two lengths 100 and 102 placed end-to-end as shown in FIG. 11.

The length 100 comprises two continuous lengths of wire conductors 104 and 106 having first ends (not shown) and second ends 108 and 110 respectively both attached to the second ends of an adjacent length by a hanger 112. This hanger 112 comprises a carriage 114 riding on the rail 98 and comprising locking grippers or clips 116 and 118 in which are located respectively the ends 108 and 110 of the wire conductors. The hanger 112 comprises in addition two resilient return members each formed by a spring such as 120 connected at one end to the carriage 114 and at the other end to a support 122 attached to the rail 98.

The length 102 comprises two continuous lengths of wire conductor 124 and 126 having first ends attached to a clamping member 128 mounted under the rail 98 and second ends (not shown) attached to a hanger (not shown) similar to the hanger 112.

As shown in FIG. 12, two lengths 130 and 132 are linked up in a straddled fashion and not end-to-end. The lengths 130 and 132 comprise respectively a clamping member for the wire conductors (134 or 136) and a hanger 138 or 140.

FIG. 13 shows schematically the location of adjustment members for the adjustment of the location of the wire conductors into the curves of the supply line in order to follow, for example the curve of a railway.

The path of the railway is represented by the curved line 142 and the electric supply line by the broken line 144, which it is possible to adjust by exerting the forces shown schematically by the arrows $f_1$, $f_2$, $f_3$, $f_4$, etc.

FIG. 14 shows a first embodiment of adjustment member comprising a plate 146 attached beneath a rail 10 and to an attachment member formed by a cable 148 having one end 150 bolted to the plate and its other end attached to a clip 154 gripping the wire conductor 16.

FIG. 15 shows another embodiment of adjustment member which differs from the first by the fact that the attachment member is formed by a rod 156 having one end 158 hooked into an aperture 160 of the plate 146 and its other end hooked to a clip 164 gripping the wire conductor 16.

FIGS. 16 and 17 show a further embodiment of attachment member which differs from the preceding embodiments by the fact that it comprises two attachment members 166 and 166' each having one end attached to a vertical pin 168 on which is freely mounted a roller 170 able to roll on the exterior edge 172 of the plate 146 and their other ends attached to clips 174 and 174' respectively gripping the wire conductor 16.

It will be appreciated that the present invention is not limited to the embodiments as particularly described and shown herein and can be realised by other variations without departing from the scope of the invention. Thus, the rails can have a cross-sectional profile different from an I-shaped profile and the fixing elements can surround particularly or entirely the rail and possibly comprise springs.

Moreover, the rails can be attached not only under archways but also in the open air by using appropriate support drums, for example for a third rail.

In addition, apart from the invention having application particularly to underground transport systems, it can also be used for supplying electricity to machines such as overhead gantry cranes.

What is claimed is:

1. An electricity supply line for the supply of current to railway vehicles comprising two parallel wire connectors forming a current supply line for a current pick-up device, a rigid body supporting the wires, which body is provided with an electrically insulating covering and constituted by rails disposed end to end, and attachment members, freely mounted on the rails and able to move vertically and slide longitudinally on the rails, attaching the wires to the rails at spaced locations along the wires length, by which the wire conductors are supported alternatively such that any one attachment member supports only one of the wire conductors, each attachment member comprising a strap, a portion of said strap located transversely and beneath the rail, and a clip mounted on said portion of the strap for free sliding therealong.

2. An electricity supply line for the supply of current to railway vehicles comprising at least one wire conductor forming a current supply line for a current pick-up device, a rigid body supporting the wire which body is provided with an electrically insulating covering and constituted by rails disposed end to end, the rails grouped in lengths each comprising a certain number of rails, and a single continuous length of said wire conductor spans a length so that a first end of the conductor is attached to one end of the rail length and a second end of the conductor is attached to the other end of the rail length by means of a hanger, the hanger comprising a carriage to which is attached the second end of the wire conductor and in which at least one flexible adjustment member is connected between the carriage and the said other end of the rail length, and attachment members attaching the wire to the rails at spaced locations along the wire's length.

3. An electricity supply line for the supply of current to railway vehicles comprising at least one wire conductor forming a curved current supply line for a current pick-up device, a rigid body supporting the wire which body is provided with an electrically insulating covering and constituted by rails disposed end to end, attachment members attaching the wire to the rails at spaced locations along the wire's length, and elements capable of adjusting the position of the wire conductor to the curves of the supply line, these elements each comprising at least one connection member of which one end is attached to one edge of a plate fixed beneath a rail and the other end is attached to the wire conductor by means of a clip.

* * * * *